United States Patent
Lutz et al.

(10) Patent No.: US 12,365,326 B2
(45) Date of Patent: Jul. 22, 2025

(54) METHOD FOR CHECKING INTENDED PRESSURE MEDIUM-CONDUCTING CONTACTING OF CIRCUIT BRANCHES, ASSOCIATED WITH ONE ANOTHER, OF SEPARATE BRAKE CIRCUITS OF AN ELECTRONICALLY SLIP-CONTROLLABLE POWER BRAKE SYSTEM WITH TWO ACTUATOR UNITS, CONTACTED FOR CONDUCTING PRESSURE MEDIUM, FOR GENERATING AND CONTROLLING BRAKE PRESSURE, IN PARTICULAR FOR A MOTOR VEHICLE

(71) Applicant: Robert Bosch GmbH, Stuttgart (DE)

(72) Inventors: Sabrina Lutz, Fellbach (DE); Ralf Kinder, Auenstein (DE); Samuel Bubeck, Kawasaki (JP)

(73) Assignee: ROBERT BOSCH GMBH, Stuttgart (DE)

( * ) Notice: Subject to any disclaimer, the term of this patent is extended or adjusted under 35 U.S.C. 154(b) by 12 days.

(21) Appl. No.: 18/548,421

(22) PCT Filed: Apr. 7, 2022

(86) PCT No.: PCT/EP2022/059233
§ 371 (c)(1),
(2) Date: Aug. 30, 2023

(87) PCT Pub. No.: WO2023/001415
PCT Pub. Date: Jan. 26, 2023

(65) Prior Publication Data
US 2024/0140389 A1   May 2, 2024

(30) Foreign Application Priority Data
Jul. 22, 2021 (DE) .................... 10 2021 207 845.1

(51) Int. Cl.
*B60T 17/22* (2006.01)
*B60T 8/40* (2006.01)
*B60T 13/66* (2006.01)

(52) U.S. Cl.
CPC .......... *B60T 17/221* (2013.01); *B60T 8/4072* (2013.01); *B60T 13/662* (2013.01)

(58) Field of Classification Search
CPC .... B60T 17/221; B60T 17/227; B60T 8/4072; B60T 13/662; B60T 2270/406; B60Y 2400/90
(Continued)

(56) References Cited

U.S. PATENT DOCUMENTS

| | | | |
|---|---|---|---|
| 10,688,979 | B2 | 6/2020 | Leiber et al. |
| 2016/0272178 | A1 | 9/2016 | Feigel |

FOREIGN PATENT DOCUMENTS

| | | |
|---|---|---|
| DE | 102012201535 A1 | 10/2012 |
| DE | 102017204766 A1 | 9/2018 |
| DE | 102018202884 A1 | 8/2019 |

OTHER PUBLICATIONS

International Search Report for PCT/EP2022/059233, Issued Sep. 20, 2022.

*Primary Examiner* — Hai H Huynh
(74) *Attorney, Agent, or Firm* — NORTON ROSE FULBRIGHT US LLP

(57) ABSTRACT

A method for checking intended pressure medium-conducting contacting of circuit branches, associated with one another, of separate brake circuits of an electronically slip-controllable power brake system with two actuator units, contacted for conducting pressure medium, for generating and controlling brake pressure, in particular for a motor vehicle, and an electronic control unit for such a power brake system.

4 Claims, 3 Drawing Sheets

(58) Field of Classification Search
USPC .................................................. 701/70, 76
See application file for complete search history.

METHOD FOR CHECKING INTENDED PRESSURE MEDIUM-CONDUCTING CONTACTING OF CIRCUIT BRANCHES, ASSOCIATED WITH ONE ANOTHER, OF SEPARATE BRAKE CIRCUITS OF AN ELECTRONICALLY SLIP-CONTROLLABLE POWER BRAKE SYSTEM WITH TWO ACTUATOR UNITS, CONTACTED FOR CONDUCTING PRESSURE MEDIUM, FOR GENERATING AND CONTROLLING BRAKE PRESSURE, IN PARTICULAR FOR A MOTOR VEHICLE

FIELD

The present invention relates to a method for checking an intended pressure medium-conducting contacting of circuit branches, associated with one another, of separate brake circuits of an electronically slip-controllable power brake system with two actuator units, contacted for conducting pressure medium, for generating and controlling brake pressure, in particular for a motor vehicle, and an electronic control unit, which is further configured for carrying out the above-mentioned method.

BACKGROUND INFORMATION

Power brake systems are state of the art and are described, for example, in German Patent Application No. DE 10 2018 202 884 A1.

FIG. 1 shows the hydraulic layout of such a power brake system on which the present invention is based. For safety reasons, this power brake system is divided into two separate brake circuits (C1; C2). It comprises two separate actuator units (DPB; ESP), which are contacted with each other via two connecting lines for conducting pressure medium. These two actuator units (DPB, ESP) are connected in parallel to each other to the two brake circuits (C1; C2). The first actuator unit (DPB) features, among other things, a device that can be actuated by a driver to acquire a braking request (BRU), a first brake pressure generator (PLU) that can be power-driven, and control valves (CSV1, CSV2; PSV1, PSV2; POV; SSV) for generating and controlling a brake pressure corresponding to the braking request.

The second actuator unit (ESP) is equipped with a second brake pressure generator (RFP1; RFP2), which can also be power-driven, and with control valves (IV1-4; OV1-4; SCC1; SCC2; HSR1, HSR2), and is used for wheel-specific control of the brake pressure. The brake pressure is applied to wheel brakes (WC1-WC4), which are connected to the second actuator unit (ESP). These wheel brakes (WC1-WC4) are distributed over the two brake circuits (C1; C2) of the power brake system and are each assigned in pairs to an axle of a motor vehicle or, as shown in FIG. 1, are arranged on wheels (FL, RR, FR, RL) of a motor vehicle that are diagonally opposite each other.

The brake pressure is controlled in particular as a function of the slip conditions that currently prevail at these wheels (FL, RR, FR, RL) of the motor vehicle. For this purpose, the vehicle brake system is equipped with an electronic control unit (ECU) which acquires measurement data to this effect from sensors of the power brake system and/or of the vehicle and processes them into control signals with which the aforementioned pressure medium-controlling components of the actuator units (DPB; ESP) are controlled. For this purpose, the control valves in the actuator units (DPB; ESP) release, throttle or block pressure medium connections between the pressure medium-controlling components of the power brake system described above as required.

The measurement data are provided, among others, by a pressure sensor (PS_AC) of the first actuator unit (DPB) as well as by a pressure sensor (PS_MC2) of the second actuator unit (ESP). The first pressure sensor (PS-AC) acquires the pressure provided by the first brake pressure generator (PLU), while the second pressure sensor (PS_MC2) measures the pressure in the second brake circuit (C2).

For the sake of completeness, it should be mentioned that the braking request acquisition device (BRU) is also connected in parallel with the brake circuits (C1; C2), whereby this pressure medium connection is also designed to be controllable by means of the control valves (CSV1; CSV2), which are therefore also referred to as circuit isolating valves.

In the exceptional event of a failure of the power actuation, a driver is thus enabled to build up brake pressure in the wheel brakes (WC1-WC4) by actuating a master cylinder (MC) of the braking request acquisition device (BRU) using muscle power and thus to brake the vehicle despite the absence of power assistance.

Under operating conditions, i.e., with the power actuation intact, this pressure medium connection between the master cylinder (MC) and the brake circuits (C1; C2) is interrupted by the circuit isolating valves (CSV1, CSV2) and the driver brakes into a simulator (PFS) that can be loaded with pressure medium to acquire the braking request. A simulator control valve (SSV) controls the loading of the simulator (PFS). The simulator (PFS) simulates for the driver an actuation travel of an actuating element of the master cylinder (MC) on the one hand and an actuating force on the other hand. A pedal travel sensor (PTS) is provided in the first actuator unit (DPB) to acquire the actuation travel. In the normal state of the power brake system, the driver is therefore disconnected from the wheel brakes (WC1-WC4) and does not contribute to the brake pressure build-up.

As mentioned, the power brake system on which the present invention is based features two actuator units (DPB; ESP) which are in contact with each other via lines carrying pressure medium. When making this contact, it is important that the circuit branches (C1.1; C1.2) of the first actuator unit (DPB) assigned to the brake circuits (C1; C2) are not swapped with the circuit branches (C2.1; C2.2) of the second actuator unit (ESP).

One reason for this is that, for reasons of space and cost, not both brake circuits (C1; C2) are equally equipped with pressure sensors, so that if the brake circuit branches (C1.1, C1.2; C2.1, C2.2), which are associated with one another, are swapped, the electronic control unit (ECU) cannot control the brake pressure at all or at least only to a limited extent due to a lack of control parameters.

Due to the confusing installation situation of a power brake system in a motor vehicle, it is not easy to see by inspection whether the hydraulic contacting of the circuit branches (C1.1, C1.2; C2.1, C2.2) has been carried out as intended or whether circuit branches (C1.1, C1.2; C2.1, C2.2) have been inadvertently swapped when contacting the actuator units (DPB; ESP).

SUMMARY

The present invention provides a method for electrically checking whether the brake circuits (C1; C2) have been contacted as intended when the power brake system is installed.

The method according to the present invention is robust to the manufacturing tolerances of the installed components of the power brake system and thus detects incorrectly connected brake circuits (C1; C2) extremely reliably. For this purpose, it uses components, measurement signals or existing signal paths that are already present in the vehicle brake system and can therefore be easily and cost-effectively integrated into the control software of the electronic control unit (ECU) of a vehicle brake system.

Further advantages or advantageous further embodiments of the present invention result from the disclosure herein.

BRIEF DESCRIPTION OF THE DRAWINGS

An exemplary embodiment of the present invention is illustrated using the figures and explained in greater detail in the subsequent description.

In the figures, corresponding components are given the same reference signs.

DETAILED DESCRIPTION OF EXAMPLE EMBODIMENTS

Figure 1:
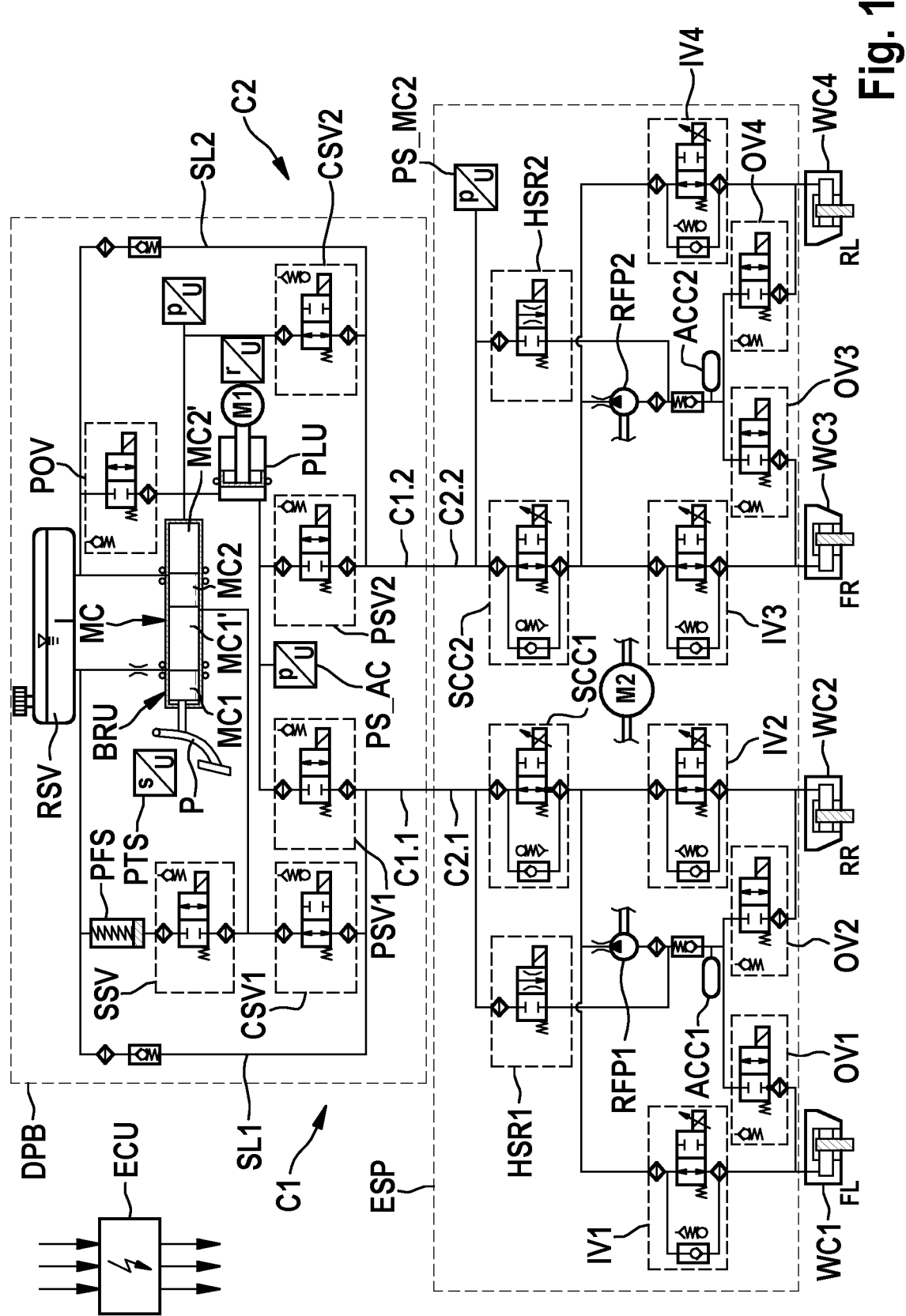
FIG. 1 shows a power brake system as it is the basis of the present invention, from the related art and has already been acknowledged above.
Figure 2:
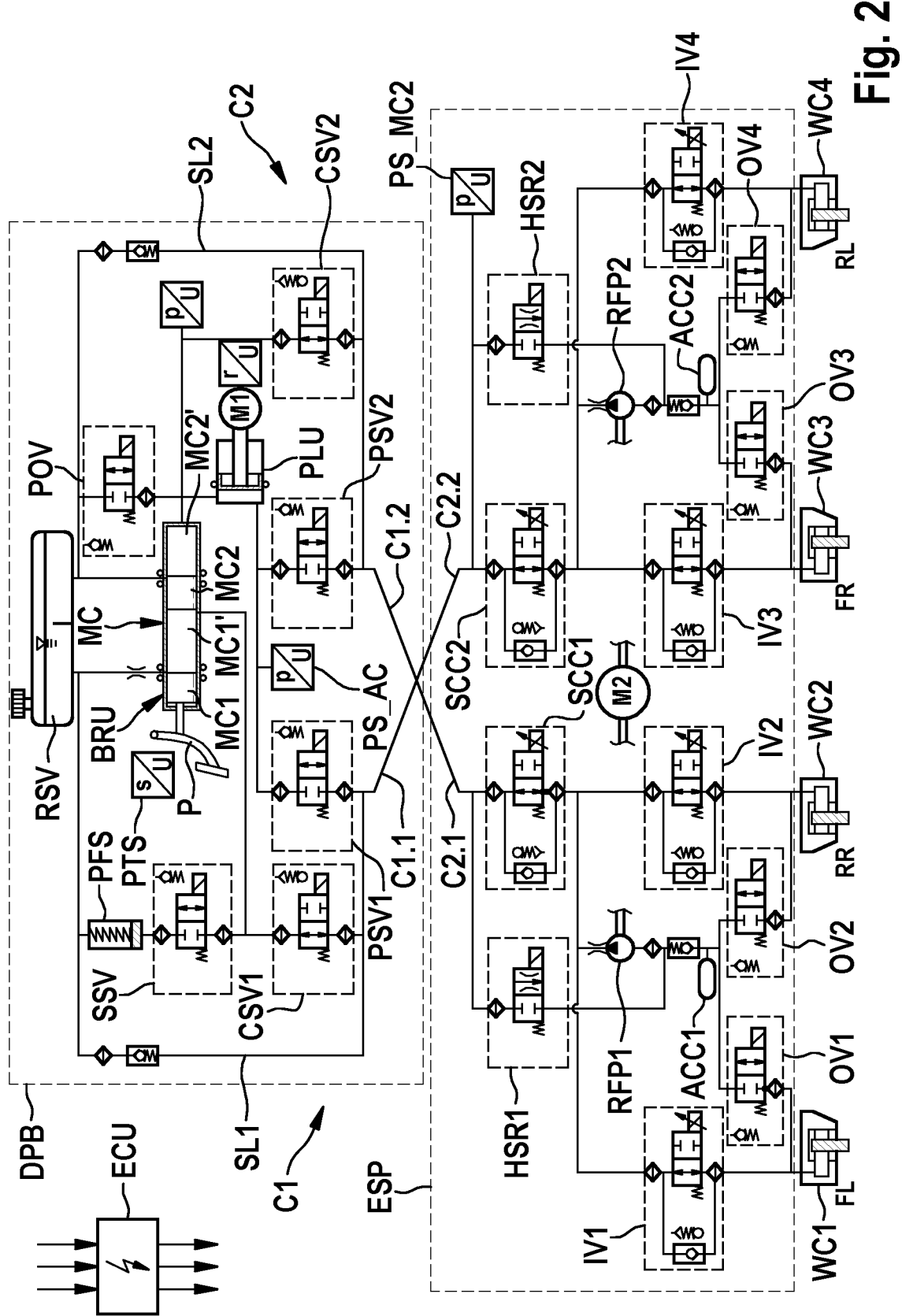
FIG. 2 shows the power brake system according to FIG. 1, but with the brake circuits connected in swapped fashion.

The power brake system shown in FIG. 2 corresponds to the power brake system shown in FIG. 1 with the exception that the pressure medium conducting contacting of the circuit branches (C1.1, C1.2; C2.1, C2.2), which associated with one another, of the actuator units (DPB; ESP) has been carried out incorrectly. The fault is that the circuit branch (C1.1) of the first actuator unit (DPB) assigned to the first brake circuit (C1) is in contact with the second circuit branch (C2.2) of the second actuator unit (ESP) assigned to the second brake circuit (C2) and that, correspondingly, the second circuit branch (C1.2) of the first actuator unit (DPB) assigned to the second brake circuit (C2) is connected to the circuit branch (C2.1) of the second actuator unit (ESP) assigned to the first brake circuit (C1). In short, when contacting the brake circuits (C1; C2), the circuit branches (C1.1; C1.2 and C2.1; C2.2, respectively), which are associated with one another, were swapped.

The present invention provides a test method for checking for such faulty contacting using an electronic control unit (ECU) of the power brake system. According to an example embodiment of the present invention, the faulty contacting of the brake circuits (C1; C2) with one another can therefore still be checked after the power brake system has been installed in the body of a motor vehicle and can be indicated to the driver or a mechanic or fitter by a corresponding warning if necessary. This warning can be, for example, a visual signal on a display and/or an acoustic signal from a loudspeaker. On-board displays or loudspeakers can be used for this purpose, as well as those of a checking device that has been coupled to the electronic control unit (ECU) to perform the check.

For a better understanding of the test method according to the present invention, the layout of the power brake system shown in FIG. 2 is described in more detail below.

The first actuator unit (DPB) of this power brake system comprises a braking request acquisition device (BRU), via which the driver can specify a braking request. For this purpose, it consists of a master brake cylinder (MC) that can be actuated by means of an actuating element, for example in the form of a pedal (P). The master brake cylinder (MC) has a directly actuated rod piston (MC1) and an indirectly actuated floating piston (MC2), two master cylinder chambers (MC1'; MC2') being enclosed between the rod piston (MC1) and the floating piston (MC2) on the one hand and between the floating piston (MC2) and the master brake cylinder housing on the other. Each master brake cylinder chamber (MC1'; MC2') is connected to one of the two brake circuits (C1; C2) of the power brake system.

The braking request is derived from the measured actuation travel of the pedal (P). For this purpose, a so-called pedal travel sensor (PTS) is provided in the first actuator unit (DPB), which converts the actuation travel of the pedal (P) into a voltage signal and forwards this voltage signal to the electronic control unit (ECU).

In the normal state of the power brake system, the master brake cylinder (MC) is uncoupled from wheel brakes (WC1-WC4) of the brake circuits (C1; C2), i.e. a pressure medium connection existing between the master brake cylinder (MC) and the brake circuits (C1; C2) with the respectively connected wheel brakes (WC1-WC4) is interrupted. This is provided by the first control valve device consisting of the two so-called circuit isolating valves (CSV1, CSV2), which block these connections as soon as they are electrically controlled or which open the connections when there is no electrical control. In the exemplary embodiment shown, the circuit isolating valves (CSV1; CSV2) are designed, by way of example, as normally open 2/2-way switching valves.

In order to allow pedal (P) actuation travel and provide mechanical feedback to the driver despite closed circuit isolating valves (CSV1; CSV2), one of the chambers (MC1') of the master brake cylinder (MC) is coupled to a simulator (PFS). This is a piston-cylinder device which can be loaded with the pressure medium from the connected chamber (MC1') of the master brake cylinder (MC). The piston is displaced against the force of an elastic return element in the cylinder when it is loaded with pressure medium. A pressure medium connection between the simulator (PFS) and the master brake cylinder (MC) is controlled by a simulator control valve (SSV). The simulator control valve (SSV) shown can be controlled electrically and it is a normally closed 2/2-way switching valve.

In addition to the components already explained, the first actuator unit (DPB) also features the first brake pressure generator (PLU). The latter is designed as a plunger unit and is accordingly equipped with a plunger piston which is received in a plunger cylinder in which the plunger piston is displaceable by a first electrically controllable motor (M1). A working chamber of the plunger unit is supplied with pressure medium from a reservoir (RSV) to which the master cylinder chambers (MC1'; MC2') of the master brake cylinder (MC) of the power brake system are also connected. The pressure medium supply to the plunger unit or the first brake pressure generator (PLU) can be controlled by an electrically controllable plunger supply valve (POV), which is designed as a normally blocking, 2/2-way switching valve, by way of example.

The first brake pressure generator (PLU) supplies two circuit branches (C1.1; C1.2) of the first actuator unit (DPB) with pressure medium under brake pressure, wherein this generated brake pressure can be acquired by means of the first pressure sensor (PS_AC) and can be supplied to the control unit (ECU) as an electrical signal (PS_AC'). For this purpose, the first pressure sensor (PS-AC) is arranged in a line section of the first actuator unit (DPB), which connects the outlet of the first brake pressure generator (PLU) to the two control valves designated as plunger isolating valves (PSV1; PSV2). Each brake circuit (C1; C2) is equipped with a plunger control valve (PSV1, PSV2) whose function is to isolate the first brake pressure generator (PLU) from the respective assigned brake circuit (C1; C2). The plunger isolating valves (PSV1; PSV2) are designed for this purpose as electrically controllable and normally blocking 2/2-way switching valves.

Similar to the first actuator unit (DPB), the second actuator unit (ESP) is also equipped with electrically actuated control valves (HSR; SCC; IV1-IV4; OV1-OV4) and with a pressure generator, which is referred to below as the second pressure generator for differentiation purposes. This second pressure generator features one pump (RFP1; RFP2) per brake circuit (C1; C2) of the second actuator unit (ESP), i.e. a total of two pumps (RFP1; RFP2), which can be actuated jointly by a second drive motor (M2). The suction side of each of these pumps (RFP1; RFP2) of the second pressure generator is connected to the reservoir (RSV) of the power brake system via an assigned suction line (SL1; SL2). In each suction line (SL1; SL2) there is a spring-loaded check valve which releases a pressure medium flow from the reservoir (RSV) to the pump (RFP1; RFP2) and blocks the opposite direction, i.e. from the pump (RFP1; RFP2) back to the reservoir (RSV).

The circuit isolating valves (CSV1; CSV2) and the plunger control valves (PSVT; PSV2) of the first actuator unit (DPB) are each connected in pairs on the drain side to one of these suction lines (SL1; SL2). Furthermore, intake valves (HSR1; HSR2) are provided in the assigned suction lines (SL1; SL2) immediately upstream of the pumps (RFP1; RFP2) of the second pressure generator in the second actuator unit (ESP). Together with pressure control valves (SCC1; SCC2) on the pressure side of each pump (RPP1; RPP2), the brake pressure provided by the pump (RFP1; RFP2) of the second pressure generator can thus be controlled in each brake circuit (C1; C2). While the intake valves (HSR1; HSR2) are designed for this purpose as electrically controllable, as normally blocking 2/2-way switching valves, the pressure control valves (SCC1; SCCV2) are normally open 2/2-way control valves, each of which has a check valve opening in the direction of the wheel brakes (WC1-WC4) connected in parallel.

The brake pressure in the second brake circuit (C2) is acquired by a second pressure measuring device in the second actuator unit (ESP), a so-called circuit pressure sensor (PS_MC2), converted into a voltage signal (PS_MC2') and forwarded to the electronic control unit (ECU) for evaluation.

Finally, each wheel brake (WC1-WC4) is assigned a valve pair consisting of a pressure build-up valve (IV1-IV4) and a pressure reduction valve (OV1-OV4) in order to be able to set the pressure of the respective wheel brake (WC1-WC4) individually for each wheel. The pressure build-up valve (IV1-IV4) is designed as an electrically controllable, normally open 2/2-way control valve, while the pressure reduction valve (OV1-OV4) is a normally closed 2/2-way switching valve. The pressure reduction valve (OV1-OV4) is located in a return line (RL1; RL2) from the respective wheel brake (WC1-WC4) to the suction side of the assigned pump (RFP1; RFP2) of the second brake pressure generator (ESP). In this return flow, there is a so-called low-pressure accumulator (ACCT; ACC2) for each brake circuit (C1; C2), which initially buffers pressure medium discharged from the wheel brakes (WC1-WC4) until it is sucked out again by the associated pump (RFP1; RFP2) to increase the brake pressure.

Figure 3:
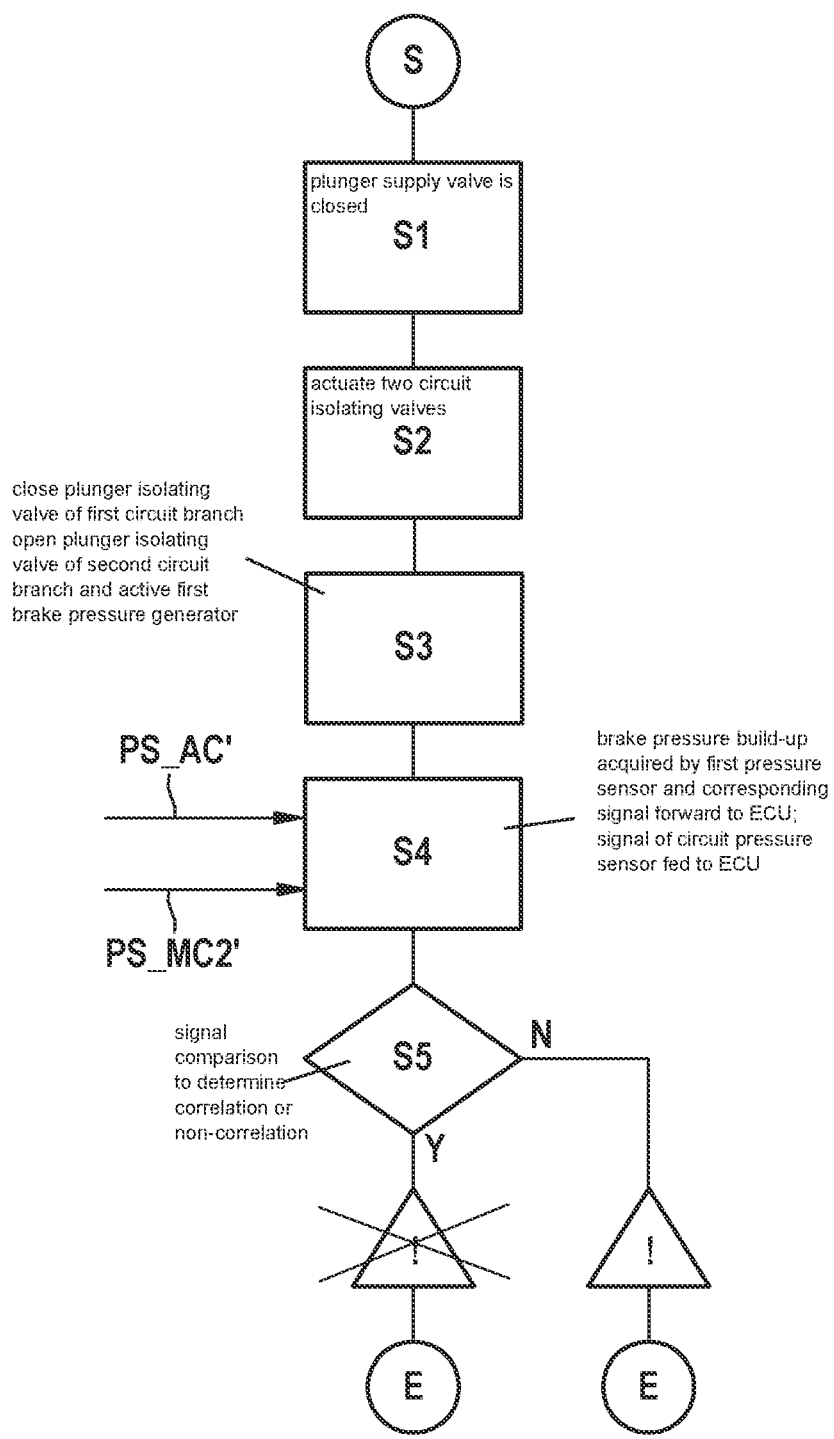
FIG. 3 illustrates the method underlying the present invention by means of a flow chart.

As already mentioned, the two brake circuits (C1; C2) between the two actuator units (DPB; ESP) have swapped contacts, i.e. the brake circuit branch (C1.1) of the first actuator unit (DPB) is connected to the second brake circuit branch (C2.2) of the second actuator unit (ESP), while the second brake circuit branch (C1.2) of the first actuator unit (DPB) is connected to the first brake circuit branch (C2.1) of the second actuator unit (ESP). Such a fault can be detected by the electronic control unit (ECU) using the test method illustrated by a flow chart in FIG. 3 and explained below:

After the start (S) of the test method, the plunger supply valve (POV) is closed in a first step (S1), thus interrupting the pressure medium connection of the first brake pressure generator (PLU) with the reservoir (RSV).

In a subsequent step (S2), the two circuit isolating valves (CSV1; CSV2) of the first actuator unit (DPB) are electrically actuated in such a way that they assume their locked position and thus disconnect the master brake cylinder (MC) from the brake circuits (C1; C2).

In the layout shown in the figure, the circuit isolating valves (CSV1; CSV2) are electrically energized for this purpose and the plunger supply valve (POV) is not (no longer) energized.

Now, in step 3 (S3), the plunger isolating valve (PSVT) of the first circuit branch (C1.1) of the first actuator unit (DPB) is closed and the plunger isolating valve (PSV2) of the second circuit branch (C1.2) is opened, and then the first brake pressure generator (PLU) is actuated. The circuit branch (C1.2) released by the plunger control valve (PSV2) is connected to the circuit branch (C2.2), i.e. the circuit branch in which the second pressure sensor (PS_MC2) is located, if the circuit branches (C1.1, C1.2; C2.1, C2.2) are correctly contacted.

A brake pressure build-up caused by the operation of the first brake pressure generator (PLU) is acquired by the first pressure sensor (PS AC) of the first actuator unit (DPB) and the corresponding signal (PS_AC') is forwarded to the electronic control unit (ECU). Furthermore, the signal (PS_MC2') of the circuit pressure sensor (PS_MC2) is fed to the electronic control unit (ECU) (step S4).

The electronic control unit (ECU) then performs a signal comparison in step S5 (ECU) to determine any correlation or non-correlation between the incoming signals (PS_AC'; PS_MC2').

No parallel pressure increase takes place at the circuit pressure sensor (PS_MC2) of the second actuator unit (ESP) when the circuit branches (C1.1, C1.2; C2.1, C2.2) are connected in swapped fashion to the actuator units (DPB; ESP) because the circuit branch (C2.2) is not supplied with pressure medium from the first brake pressure generator (PLU) due to the closed plunger isolating valve (PSVT). Consequently, the signals (PS_AC'; PS_MC2') arriving at the electronic control unit (ECU) differ greatly or do not correlate with each other. Non-correlating measurement signals are easy to detect during a signal comparison and are interpreted as faulty contacting of the circuit branches (C11, C1.2; C2.1, C2.2). In the event of an error, the electronic control unit (ECU) then initiates the output of a corresponding warning message and then terminates the method.

If the circuit branches (C1.1, C1.2; C2.1, C2.2) were connected as intended to the actuator units (DPB, ESP) as shown in FIG. 1, a corresponding pressure increase would occur at the second pressure sensor (PS_MC2) of the second actuator unit (ESP) in parallel with the pressure increase at the first pressure sensor (PS_AC) of the first actuator unit (DPB), and the signals (PS_AC'; PS_MC2') arriving at the electronic control unit (ECU) would at least largely correspond or correlate with one another. The electronic control unit (ECU) would accordingly conclude that the brake circuits (C1; C2) have been correctly contacted and complete the method by suppressing the output of a warning signal.

Of course, modifications or advantageous further developments of the described method are possible without leaving the scope of the present invention.

The invention claimed is:

1. A method for checking an intended pressure medium-conducting contacting of circuit branches, which are associated with one another, of separate brake circuits of an electronically slip-controllable power brake system with two actuator units contacted for conducting pressure medium, for brake pressure generation and control, for a motor vehicle, wherein the power brake system includes:
a device that can be actuated by a driver to acquire a braking request,
a controllably drivable first brake pressure generator of a first actuator unit configured to generate a brake pressure in the brake circuits,
a plunger supply valve configured to control a first pressure medium connection of the first brake pressure generator to a pressure medium reservoir,
a first pressure sensor configured to acquire a pressure provided by the first brake pressure generator,
a controllably drivable second brake pressure generator of a second actuator unit for wheel-specific control of the brake pressure in wheel brakes of the brake circuits,
a second pressure sensor configured to acquire pressure in one of the brake circuits,
circuit isolating valves configured to control pressure medium connections from the braking request acquisition device to the brake circuits,
plunger isolating valves configured to control a pressure medium connection from the first pressure generator to the brake circuits, and
an electronic control unit configured to acquire signals from the first and second pressure sensors and process them into electrical control signals for the first and second pressure generators, and the plunger supply value, circuit isolating values, and plunger isolating values,
the method comprising the following steps:
interrupting a pressure medium connection of the first pressure generator to the pressure medium reservoir by the electronic control unit by corresponding actuation of the plunger supply valve;
interrupting, by the electronic control unit, the pressure medium connections from the braking request acquisition device to the brake circuits by corresponding actuation of the circuit isolating valves;
opening, by the electronic control unit, the pressure medium connection between the first brake pressure generator and the brake circuit equipped with the second pressure sensor and blocking the corresponding pressure medium connection between the first brake pressure generator and the other brake circuit by corresponding actuation of the plunger isolating valves;
generating, by the electronic control unit, brake pressure by actuating the first brake pressure generator, the brake pressure being acquired by the first pressure sensor and being transmitted to the electronic control unit; and
concluding, by the electronic control unit, that the contacts of the circuit branches have been swapped when a signal acquired simultaneously by the second pressure sensor and forwarded to the electronic control unit does not correlate with a signal acquired by the first pressure sensor.

2. The method according to claim 1, wherein, based on a detection of a swapped contacting of the circuit branches, a warning signal is output by the electronic control unit.

3. The method according to claim 2, wherein the warning signal of the electronic control unit informs a person optically and/or acoustically of the swapped contacting of the brake circuit branches.

4. An electronic control unit for building up and controlling brake pressure in wheel brakes of an electronically slip-controllable power brake system, the power brake system including:
a device that can be actuated by a driver to acquire a braking request,
a controllably drivable first brake pressure generator of a first actuator unit configured to generate a brake pressure in the brake circuits,
a plunger supply valve configured to control a first pressure medium connection of the first brake pressure generator to a pressure medium reservoir,
a first pressure sensor configured to acquire a pressure provided by the first brake pressure generator,
a controllably drivable second brake pressure generator of a second actuator unit for wheel-specific control of the brake pressure in wheel brakes of the brake circuits,
a second pressure sensor configured to acquire pressure in one of the brake circuits,
circuit isolating valves configured to control pressure medium connections from the braking request acquisition device to the brake circuits,
plunger isolating valves configured to control a pressure medium connection from the first pressure generator to the brake circuits, and
the electronic control unit configured to acquire signals from the first and second pressure sensors and process them into electrical control signals for the first and second pressure generators, and the plunger supply value, circuit isolating values, and plunger isolating values,
wherein the electronic control unit is configured to:
interrupt a pressure medium connection of the first pressure generator to the pressure medium reservoir by corresponding actuation of the plunger supply valve;
interrupt the pressure medium connections from the braking request acquisition device to the brake circuits by corresponding actuation of the circuit isolating valves;
open the pressure medium connection between the first brake pressure generator and the brake circuit equipped with the second pressure sensor and block the corresponding pressure medium connection between the first brake pressure generator and the other brake circuit by corresponding actuation of the plunger isolating valves;
generate brake pressure by actuating the first brake pressure generator, the brake pressure being acquired by the first pressure sensor and being transmitted to the electronic control unit; and
conclude that the contacts of the circuit branches have been swapped when a signal acquired simultaneously by the second pressure sensor and forwarded to the electronic control unit does not correlate with a signal acquired by the first pressure sensor.

* * * * *